Dec. 28, 1971  G. HIRS ET AL  3,630,892
PROCESS FOR REMOVING DISSOLVED NICKEL FROM A CONTAMINATED LIQUID
Filed Dec. 10, 1970  2 Sheets-Sheet 1

INVENTORS
GENE HIRS.
ROBERT S. KAZAR.
BY
CULLEN, SETTLE, SLOMAN & CANTOR.
ATT'YS.

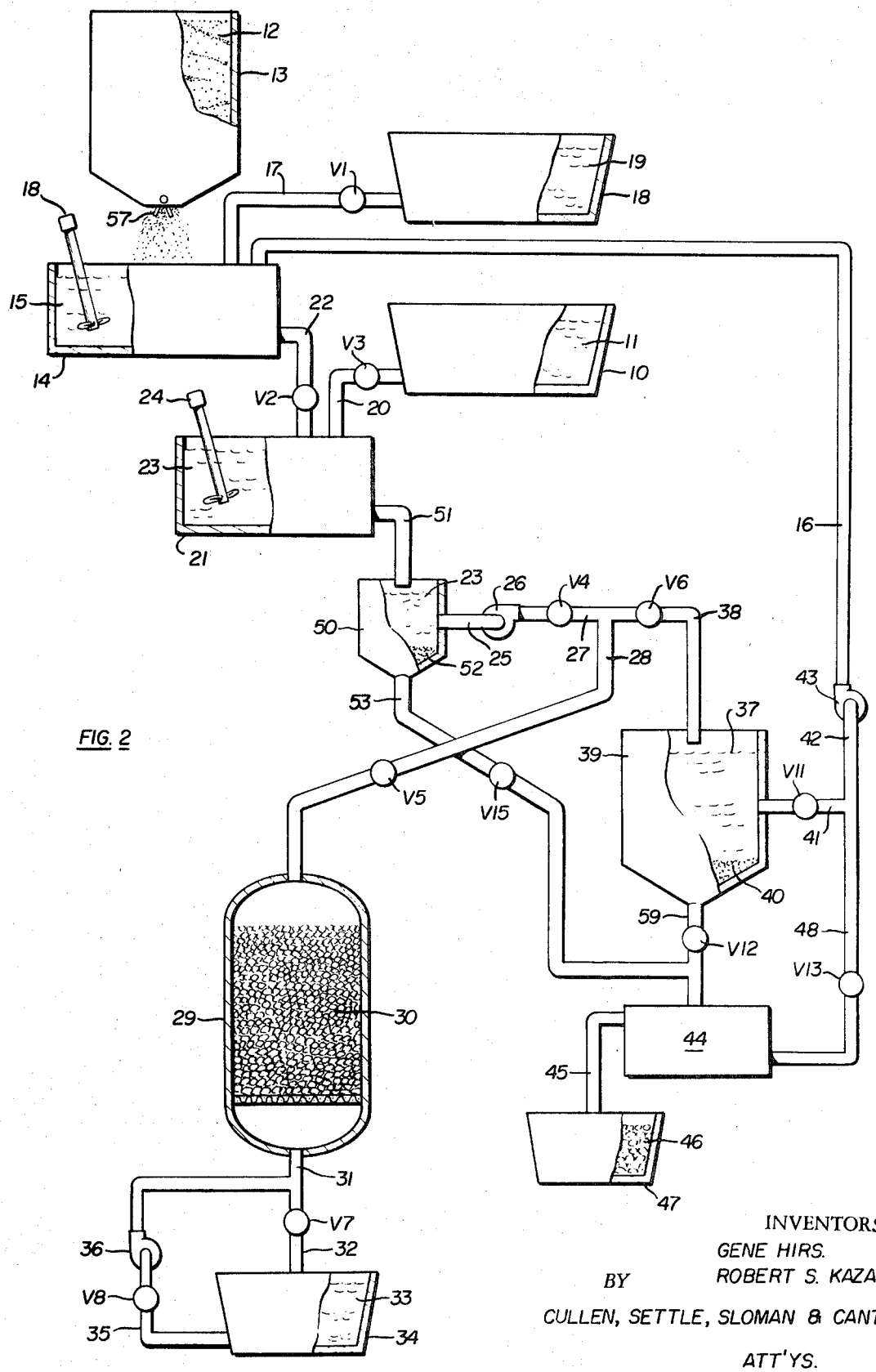

3,630,892
PROCESS FOR REMOVING DISSOLVED NICKEL
FROM A CONTAMINATED LIQUID
Gene Hirs, Birmingham, and Robert S. Kozar, Livonia, Mich., assignors to Hydromation Filter Company, Livonia, Mich.
Filed Dec. 10, 1970, Ser. No. 96,697
Int. Cl. C02c 5/02
U.S. Cl. 210—42    8 Claims

ABSTRACT OF THE DISCLOSURE

A method of removing nickel from plating rinse water or the like by upwardly adjusting the pH of an aqueous nickel solution to precipitate the nickel as a colloidal suspension, passing the precipitate suspension through a deep-bed filter having a granular, synthetic organic medium therein to deposit the nickel precipitate on the filter medium, backwashing the filter medium to remove the deposited nickel precipitate therefrom and then filtering the backwash liquid through a conventional filtration mechanism.

BACKGROUND OF THE INVENTION

Several of the recently enacted water pollution control laws define the maximum dissolved nickel contents of industrial waste water as being less than two parts per million by weight. Plating rinse waters from nickel plating baths commonly contain dissolved nickel in the range of 100 to 200 parts per million of nickel by weight. Prior to this invention, there has been no known process which will efficiently and economically remove dissolved nickel contaminants of an initial value of 200 parts per million or less to within the allowable concentration of two parts per million. Naturally, the electroplating industry is quite concerned with the problem of nickel pollution and a demand for an efficient and economic process of this type poses a new and pressing problem for the entire industry.

It has long been known that dissolved nickel (commonly in the form of nickel sulphate) in any concentration can be readily precipitated out of solution to varying degrees by an adjustment of the pH of the solution. For example, the following table shows the amount of nickel precipitated out of a solution containing 200 p.p.m. nickel at a pH of 6.5 and adjusted as shown.

| pH Adjusted to: | Percent nickel precipitated |
|---|---|
| 7.5 | 6.4 |
| 8.0 | 64.0 |
| 8.5 | 94.5 |
| 9.0 | 99.0 |

The problem in nickel removal is that, when the concentration of nickel is below 200 p.p.m., its precipitated form is colloidal or near-colloidal in nature and simply remains in colloidal suspension. This colloidal nature makes removal by settling or conventional filtering techniques impossible or impractical. Settling either never takes place or is much too slow to be practical. Cloth or paper filters fine enough to catch the nickel precipitate "blind-off" or surface load almost immediately, rendering them useless in the removal of nickel precipitate. The same surface loading occurs with precoat filters of the diatomaceous earth or cellulose type.

If the concentration of dissolved nickel is above 200 p.p.m., upon proper adjustment of the pH, the floc of nickel precipitate will be so thick or concentrated that many of the individual colloidal or near-colloidal nickel precipitate particles will agglomerate and readily settle out of the contaminated liquid. However, even when such settling takes place, not all of the colloidal nickel precipitate settles out, and there remains in suspension an amount of precipitated nickel far in excess of that permitted under most water pollution control laws. For instance, a solution containing 500 p.p.m. dissolved nickel with a pH of 3.0 was adjusted to a pH of 8.5, a value at which, theoretically 100 percent precipitation of nickel should occur. After 120 minutes of settling, 95 p.p.m. of precipitated nickel remained in suspension. Again, the remaining suspended nickel cannot be removed by settling or convetional means of filtration.

Thus, a primary objective of the present invention is to provide a practical and economical process for the removal of dissolved nickel from contaminated liquids.

DESCRIPTION OF THE INVENTION

The present invention has its primary application to the removal of dissolved nickel from plating rinse waters wherein the concentration of nickel is 200 p.p.m. or less. Such a solution is first treated with soda ash ($Na_2CO_3$) to form a nickel precipitate of nickel carbonate and nickel hydroxide. Lime or some other strongly basic chemical can also be used, but soda ash is preferred because of its low cost and because a lesser amount is required to accomplish the same amount of precipitation.

Theoretical 100 percent precipitation of nickel can be closely approached with the addition of excess amounts of soda ash or other like chemical. However, testing has shown that above 96 percent precipitation, the nickel hydroxides begin to hydrate at an ever increasing rate. This hypdration consumes much of the soda ash or like chemical (lime, etc.) and adds a great deal of non-nickel precipitate without contributing materially to the precipitation of the nickel. For any given nickel waste solution, the amount of precipitating chemical (soda ash, lime, etc.) necessary to reach optimum precipitation can be readily determined empirically.

It is not critical to the present invention that the nickel waste solution coming to the treatment process of the present invention contains less than 200 p.p.m. nickel. However, under such high nickel concentration conditions it is recommended that the pH be adjusted by the addition of soda ash or the like, the resultant precipitate be allowed to settle out for a reasonable amount of time (on the order of one-half to one hour), and the supernatant liquid-nickel suspension be drawn off and transferred to the filtration step outlined hereinafter. In this manner, an unsatisfactorily high concentration of suspended nickel precipitate in the supernatant is avoided, and an inexpensive, efficient initial separation is obtained without filtration.

Thus, after precipitation of 200 p.p.m. or less of nickel and after precipitation and settling in solutions of greater than 200 p.p.m. of nickel, the waste solution is passed through a bed of granular filter media formed of a synthetic organic polymeric material, such as polyvinyl chloride, polyethylene and polypropylene. Such materials are described in detail in the pending application of Gene Hirs, Ser. No. 696,624, filed Jan. 9, 1968, now U.S. Patent No. 3,557,955 and assigned to the assignee of the present invention.

Testing has shown that the filter media can be no smaller than 75 mesh (U.S. sieve) to preclude blind-off or surface loading by the nickel precipitate. It was also determined that the filter media can be no larger than 20 mesh if any practical quantity of the fine, delicate nickel precipitate is to be entrapped and removed from the waste water.

The effluent from the bed of granular filter media is clarified waste water with the nickel removed. No further treatment is required.

The backwash from the granular filter bed contains a high concentration of nickel precipitate. This high concentration of nickel precipitate will readily settle, unlike the nickel precipitate prior to filtration. The backwash liquid is settled, the supernatant being drawn off and sent back to the beginning of the process for retreatment. The settled nickel precipitate is then of sufficient concentration to be dewatered to a filter cake by any conventional means.

The nickel precipitate filter cake can either be disposed of or dissolved with a weak acid, preferably sulfuric acid, for reuse as a nickel plating reagent.

On the drawings:

FIG. 2 is a schematic elevation view of a second embodiment of present invention wherein primary settling precedes deep bed filtration.

As shown on the drawings:

Figure 1:
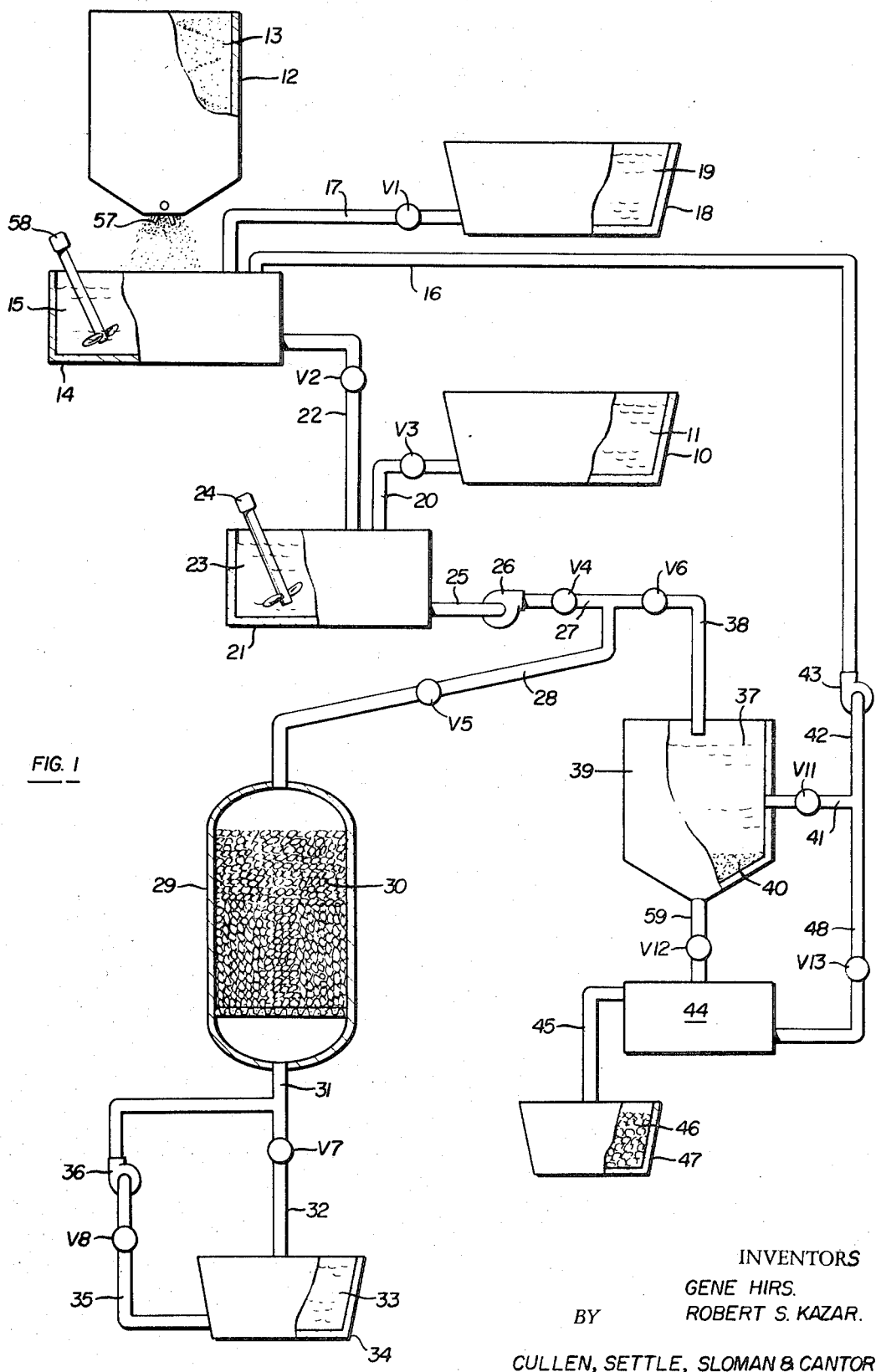
FIG. 1 is a schematic elevation view of one embodiment of the present invention.

As shown in FIG. 1 tank 10 contains contaminated liquid 11 with dissolved nickel contaminant. Contaminated liquid 11 passes from tank 10 through line 20 into mixing tank 21, valve V3 being open. Dry soda ash 13 is stored in hopper 12. As was previously stated, lime or some other strongly basic chemical could also be used, but soda ash is added to mixing tank 14 along with make up water 19, stored in tank 18 and passing through line 17. Valve V1 is opened only when make up water 19 is needed. In addition, dewatering filtrate and backwash supernatant, both more fully described hereinafter, are added to tank 14 from line 16 to facilitate dissolution of the soda ash.

The soda ash solution 15, mixed by mixer 58, is a saturated solution, containing fifteen to twenty percent of soda ash by weight. Solution 15 passes through line 22 and open valve V2 into tank 21 in such quantities as are necessary to precipitate the dissolved nickel in waste liquid 11 to about 90 to 97 percent of theoretically complete precipitation. The amount of soda ash solution 15 needed varies with the pH of contaminated liquid 11, the concentration of dissolved nickel, and the total influent flow rate.

Waste liquid 11 and soda ash solution 15 are thoroughly mixed in tank 21 with mixer 24 until the nickel precipitate is fully developed; generally, this requires about 15 minutes of mixing. The nickel precipitated waste liquid 23 is then drawn from tank 21 by pump 26 through lines 25, 27, and 28 into deep bed filter vessel 29. Valves V4, V5, and V7 are open and valves V6 and V8 are closed.

Vessel 29 contains granular filter media 30 which is of the size range 20 to 75 mesh (U.S. sieve), the whole filter being commonly referred to as a deep bed filter. Preferably, the filter media is an organic, polymeric material such as polyethylene, polypropylene, or polyvinyl chloride, as above explained.

The nickel precipitate particles are entrapped in the body of filter media, and the waste liquid passes from the deep bed filter as clean liquid 33 through lines 31 and 32 into tank 34 for storage or disposal.

The normal flow of precipitated waste liquid into the filter medium and effluent from the filter medium will continue until such time as sufficient nickel precipitate particles have become entrapped in the body of filter media to substantially inhibit the flow of liquid therethrough or until such time as the effluent in line 31 is of an intolerable degree of turbidity. Either the increase in resistance to flow of liquid through the filter medium or such increased turbidity may be readily measured and used to determine the necessity for cleansing the filter media. The necessity for starting the backwash cycle can be determined by the measurement of the pressure drop across the filter medium. For example, simple pressure gauges can be installed in lines 28 and 31, and a given differential between the gauges would sound an alarm, give a visual indication, or even automatically initiate the cleansing cycle. Alternatively, a continuous turbidity monitoring system may be installed in the clean outlet or effluent line 31, such a monitoring system again giving an audible or visual alarm, or initiating automatically the cleansing cycle.

The backwash is initiated by closing valves V1, V2, V3, V4, V7 and stopping pump 26, thereby halting filtration. Pump 36 is started and valves V8, V6, and V5 are opened. Clarified liquid 33 is used for the backwash and passes from tank 34, through lines 35 and 31 into filter medium 30 with the aid of pump 36. The entrapped nickel precipitate is washed out of the filter medium in a highly concentrated form as backwash liquid 37.

The backwash liquid passes through lines 28 and 38 into settling tank 39. The nickel precipitate in the highly concentrated form as found in backwash liquid 37 is allowed to settle out of suspension and is designated nickel precipitate concentrate 40.

The backwash continues until such time as the deep bed filter is sufficiently cleansed, at which time pump 36 is stopped and valves V8 and V6 are closed. The normal filtration cycle may begin by starting pump 26 and opening valves V1, V2, V3, V4, V5 and V7.

Not all nickel precipitate will settle out in tank 39. Thus, the supernatant from tank 39 is transferred to the beginning of the process for retreatment. In the given embodiment of the present invention, this supernatant is used to help dissolve the sode ash 13 and is transferred to tank 14 through lines 41, 42, and 16 by opening valve V11 and starting pump 43.

When a sufficient quantity of nickel precipitate concentrate 40 has been accumulated in tank 39, it is transferred to filter 44 through filter press, flat bed cloth or paper filter, or vacuum filter.

The filter cake 46 from filter 44 is basically nickel carbonate and nickel hydroxide, which passes from filter 44 via conveyor line 45 for storage in tank 47. The filter cake 46 can either be disposed of or dissolved with a weak acid and reused as a plating reagent.

The filtrate from filter 44, like the supernatant from settling tank 39, is transferred via lines 48, 42 and 16 by opening valve V13 and starting pump 43.

FIG. 2 represents another embodiment of the present invention which would be used to remove nickel contaminants from a waste liquid wherein the concentration of nickel exceeds 200 p.p.m. The configuration of FIG. 2 is very similar to that of FIG. 1, and like numerical designations represent like items with similar uses. However, in FIG. 2, there is a primary settling tank 50 which receives precipitated waste liquid 23 via line 51 prior to deep bed filtration.

This primary filtration is necessary for waste liquids containing greater than 200 p.p.m. nickel so as to remove that amount of nickel precipitate which will readily settle due to agglomeration of the colloidal precipitate.

The supernatant from tank 50 will contain a substantial residual of nickel precipitate which must be removed and which is treated exactly as the precipitated waste liquid as outlined in the explanation of FIG. 1.

The nickel precipitate settled out in tank 50 is drawn off by opening valve V15 and passing it through line 53 to filter press 44. This nickel precipitate concentrate 52 is treated exactly as the nickel precipitate 40 found in tank 39.

Thus, the contact between the nickel precipitate and the medium changes the precipitate in some manner not fully understood at this time. The medium is a synthetic, organic, polymeric material (preferably polyvinyl chloride, polyethylene or polypropylene) and such materials have a very definite static charge. One proposed explanation is that the static charge inherent in the medium either neutralizes or changes the charges on the precipitate particles, so that the precipitate particles agglomerate after filtration. Another proposed explanation resides in the gelatinous nature of the original precipitate and the possibility that the pressure flow of liquid through the medium-entrapped gel changes the gel to a non-gelatinous material which is merely suspended in the backwash liquid and which is subsequently easily filtered.

Although the change in filterability is not understood, it is dramatic. The significance of the change will be appreciated, since the precipitate before filtration is simply inseparable from the liquid at concentrations of less than about 200 parts per million nickel by weight, while the precipitate from the backwash is easily filtered through a paper medium or the like.

What is claimed is:

1. In a process for removing dissolved nickel from a contaminated liquid, the steps of (a) precipitating the nickel out of solution by an upward adjustment of the pH of said contaminated liquid, (b) passing said contaminated liquid with precipitated nickel through a bed of granular, synthetic polymeric filter media with granules in the size range of U.S. Sieve number 20 to number 75, (c) terminating the flow of contaminated liquid through said bed of filter media only after the body of granular filter media becomes at least partially clogged with entrapped nickel precipitate, (d) backwashing said bed of granular filter media to remove at least part of said entrapped nickel precipitate in suspension in a backwash liquid, (e) passing the backwash liquid and removed nickel precipitate from said backwash to a settling tank, (f) transferring the supernatant from said settling tank to the beginning of the process for retreatment, (g) passing the residue of settled nickel precipitate from said settling tank to means for dewatering said nickel precipitate residue, and (h) transferring the filtrate from said dewatering means to the beginning of the process for retreatment.

2. In a process for removing dissolved nickel from a contaminated liquid, the steps of (a) precipitating the nickel out of solution by an upward adjustment of the pH of said contaminated liquid, (b) passing said contaminated liquid with precipitated nickel to a primary settling tank, (c) passing the residue of settled nickel precipitate from said primary settling tank to means for dewatering said nickel precipitate residue, (d) transferring the filtrate from said dewatering means to the beginning of the process for retreatment, (e) passing the supernatant with a residual of precipitated nickel from said primary settling tank through a bed of granular, synthetic polymeric filter media with granules in the size of U.S. Sieve number 20 to 75, (f) terminating the flow of said supernatant through said bed of filter media only after the body of granular filter media becomes at least partially clogged with entrapped nickel precipitate, (g) backwashing said bed of granular filter media to remove at least part of said entrapped nickel precipitate, (h) passing the liquid and removed nickel precipitate from said backwash to a secondary settling tank, (i) transferring the supernatant from said secondary settling tank to the beginning of the process for retreatment, (j) passing the residue of settled nickel precipitate from said secondary settling tank to means for dewatering said nickel precipitate residue, and (k) transferring the filtrate from said dewatering means to the beginning of the process for retreatment.

3. In a process for removing dissolved nickel from a contaminated liquid, the concentration of dissolved nickel being less than about 200 p.p.m. nickel by weight, the steps of (a) adjusting the pH of said contaminated liquid to precipitate substantially all of the dissolved nickel out of the solution, (b) passing said contaminated liquid with precipitated nickel through a deep bed filter containing a filter medium consisting essentially of granular, synthetic, polymeric filter media, the granules of which are of a size ranging from U.S. Sieve number 20 through U.S. Sieve number 75, (c) continuing step (b) until the filter medium becomes at least partially clogged with entrapped precipitate, (d) halting the filtration operation and backwashing the filter medium to remove at least part of said entrapped nickel precipitate in suspension in a backwash liquid, and (e) flowing the mixture of backwash liquid and removed nickel precipitate through a fibrous filter medium to separate the precipitate from said backwash liquid.

4. The process as defined in claim 3, wherein said filter medium is selected from the group consisting of polyethylene, polypropylene and polyvinyl chloride.

5. The process as defined in claim 3, wherein said backwash liquid is the effluent from the performance of step (b).

6. The process as defined in claim 3, wherein the effluent from step (e) is recycled for processing again through step (b).

7. The process as defined in claim 3, wherein step (d) is carried out with the filter medium remaining in situ.

8. The process as defined in claim 3, wherein the starting liquid containing less than about 200 p.p.m. nickel by weight is the supernatant from a previously settled nickel precipitate.

References Cited
UNITED STATES PATENTS

| | | | |
|---|---|---|---|
| 2,628,165 | 2/1953 | Bliss | 210—28 X |
| 2,711,958 | 6/1955 | Schaufelberger et al. | 75—119 |
| 2,845,333 | 7/1958 | Schaufelberger | 23—183 |
| 3,350,167 | 10/1967 | McMullen et al. | 23—61 |

MICHAEL ROGERS, Primary Examiner

U.S. Cl. X.R.

23—61, 183; 75—119; 210—60, 73, 80, 82